US012330148B2

(12) United States Patent
Jayne et al.

(10) Patent No.: US 12,330,148 B2
(45) Date of Patent: *Jun. 17, 2025

(54) HUMIDIFIED SAMPLE PREPARATION STATION FOR SERIAL CRYSTALLOGRAPHY

(71) Applicant: Mitegen, LLC, Ithaca, NY (US)

(72) Inventors: Richard Jayne, Lansing, NY (US); David Closs, Freeville, NY (US); Benjamin A. Apker, Barton, NY (US); Robert E. Thorne, Ithaca, NY (US)

(73) Assignee: MiTeGen, LLC, Ithaca, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,738

(22) Filed: Jan. 25, 2024

(65) Prior Publication Data
US 2024/0216906 A1    Jul. 4, 2024

Related U.S. Application Data

(63) Continuation of application No. 17/397,383, filed on Aug. 9, 2021, now Pat. No. 11,925,931.

(Continued)

(51) Int. Cl.
*B01L 1/02*    (2006.01)
*B01L 3/00*    (2006.01)
(Continued)

(52) U.S. Cl.
CPC .............. *B01L 1/025* (2013.01); *B01L 3/508* (2013.01); *B01L 7/00* (2013.01); *G02B 21/06* (2013.01);
(Continued)

(58) Field of Classification Search
CPC .. B01L 1/025; B01L 3/508; B01L 7/00; B01L 2300/0663; B01L 2300/123; B01L 2300/18; G02B 21/06; G02B 27/0006
See application file for complete search history.

(56) References Cited

U.S. PATENT DOCUMENTS 4,111,753 A  *  9/1978  Folsom ................. C12M 41/14
                                               435/801
5,851,790 A  *  12/1998  Walker ..................... G01N 1/31
                                               435/40.51

(Continued)

OTHER PUBLICATIONS

Papakostas TV, Thick-film polymer sensors for physical variables, May 2000, Measurement + Control vol. 33 pp. 105-108 (Year: 2000) (Year: 2000).*

(Continued)

*Primary Examiner* — Jill A Warden
*Assistant Examiner* — Alex Ramirez
(74) *Attorney, Agent, or Firm* — Quinn IP Law

(57) ABSTRACT

Humidified sample preparation station for serial crystallography according to one embodiment is a humidified enclosure that delivers relative humidities above 95% and preferably above 97% in standard operation, and that can allow microscope observation of samples within. Humidified sample preparation station for serial crystallography can be used for preparation of protein crystal samples for examination using X-rays and for protein structure determination by X-ray crystallography, involving addition of liquid to the sample and removal of liquid from the sample using vacuum or suction.

25 Claims, 9 Drawing Sheets

Related U.S. Application Data

(60) Provisional application No. 63/118,102, filed on Nov. 25, 2020, provisional application No. 63/063,078, filed on Aug. 7, 2020.

(51) Int. Cl.
    *B01L 7/00*     (2006.01)
    *G02B 21/06*     (2006.01)
    *G02B 27/00*     (2006.01)

(52) U.S. Cl.
    CPC .. *G02B 27/0006* (2013.01); *B01L 2300/0663* (2013.01); *B01L 2300/123* (2013.01); *B01L 2300/18* (2013.01)

(56) References Cited

U.S. PATENT DOCUMENTS

| | | | |
|---|---|---|---|
| 6,485,918 B1 * | 11/2002 | Schermer | B01L 3/50853 |
| | | | 366/267 |
| 7,263,162 B2 | 8/2007 | Thorne et al. | |
| 8,210,057 B2 | 7/2012 | Thorne et al. | |
| 9,417,166 B2 | 8/2016 | Thorne et al. | |
| 9,789,486 B1 * | 10/2017 | Juers | B01L 9/06 |
| 9,855,557 B2 | 1/2018 | Thorne et al. | |
| 10,241,015 B2 | 3/2019 | Hollabaugh et al. | |
| 11,605,524 B2 | 3/2023 | Closs et al. | |
| 11,653,644 B2 | 5/2023 | Thorne et al. | |
| 2003/0143721 A1 * | 7/2003 | Levoguer | B01L 1/00 |
| | | | 422/501 |
| 2006/0204950 A1 * | 9/2006 | Ilercil | A01N 1/0273 |
| | | | 435/284.1 |
| 2008/0151368 A1 * | 6/2008 | Weiss | G02B 21/06 |
| | | | 359/390 |
| 2014/0368903 A1 * | 12/2014 | Tanner | G02B 21/24 |
| | | | 33/263 |
| 2022/0146441 A1 | 5/2022 | Thorne et al. | |
| 2022/0291098 A1 | 9/2022 | Closs et al. | |
| 2022/0412635 A1 | 12/2022 | Closs et al. | |
| 2023/0255194 A1 | 8/2023 | Thorne et al. | |

OTHER PUBLICATIONS http://www.glovebox-systems.com/GS-Glovebox-additional-devices.php (Year: 2016).*

ETS, Model 5506-Mid size temperature & Humidity Glovebox Chamber. Datasheet [online]. electro-tech systems, 2019 [retrieved on Aug. 22, 2024 internet URL www.electrotechsystems.com/products/environmental-control/chambers/series-5506-humidity-control-chambers-glove-boxes-dry-boxes-environmental-chambers/ (Year: 2019).*

* cited by examiner

HUMIDIFIED SAMPLE PREPARATION STATION FOR SERIAL CRYSTALLOGRAPHY

CLAIM OF PRIORITY AND CROSS REFERENCE TO RELATED APPLICATIONS

This application is a continuation of U.S. patent application Ser. No. 17/397,383, which was filed on Aug. 9, 2021, is now allowed, and claims the benefit of priority to U.S. Provisional Patent Application No. 63/063,078, which was filed on Aug. 7, 2020, and U.S. Provisional Patent Application No. 63/118,102, which was filed on Nov. 25, 2020. All of the foregoing applications are incorporated herein by reference in their respective entireties and for all purposes.

ACKNOWLEDGEMENT OF GOVERNMENT SUPPORT

This work was supported by the U.S. Department of Energy though award No. DE-SC0019546 titled Crystal Identification and Delivery Technology for Serial Synchrotron Crystallography awarded to MiTeGen, LLC.

BACKGROUND

The disclosure pertains to the field of biotechnology, more particularly, the disclosure pertains to the design of humidified enclosures for sample preparation and microscopic observation.

Atmosphere-controlled enclosures are widely used in preparing samples for scientific or biomedical study. The most common of these are gloveboxes. A typical glovebox is a sealed chamber, with some walls made of plexiglass or glass to allow its interior to be viewed. The chamber typically has connections or ports that allow the gas within the chamber to be removed and replaced with a desired gas, e.g., to replace oxygen-containing air with dry nitrogen ($N_2$) gas for oxygen-sensitive samples. It can have one or more doors that allow materials to be transferred into and out of the chamber. It can have an "air lock"—a small side chamber, separated from the main chamber and the exterior by two doors. Samples may be transferred into this side chamber without perturbing the gas in the main chamber; the air in the side chamber can be replaced with the same gas as in the main chamber, and then the sample transferred from the side to main chambers.

As the name "glove box" suggests, the chamber typically has two or more ports to which rubber "gloves" projecting into the chamber are attached, allowing samples inside the chamber to be manipulated without disturbing the interior atmosphere. While these provide a perfect barrier to the outside air, they can be very clumsy to use, especially when dealing with very small samples like cells and protein crystals. Alternatively, the chamber may have "iris" ports comprised of many layers (10 in one commercial implementation) of rubber, each with slits, that seal around the hand when inserted through the slits; or a single layer of folded polymer material with a central opening, where the opening is surrounded by an elastic band that closes it.

The glovebox may be designed to accommodate a microscope. The microscope may be placed entirely inside the glovebox, in which case an optically clear port in the glovebox is provided for viewing through the eyepieces. The microscope in this case is typically a binocular microscope with an integrated sample stage and illumination system. Alternatively, the microscope eyepieces and possibly also part of the imaging head may be outside the chamber. The chamber may be sealed around eyepieces or the imaging head, so that the objective lens and sample are within the chamber.

The glovebox interior may be humidified or dried to achieve a desired relative humidity. Very high humidities can lead to inorganic sample corrosion/degradation, while low humidities can lead to dehydration of biological samples. Humidification is typically provided by ultrasonic atomizers/vaporizers, membrane-based flow-through devices, or by bubbling gas through temperature controlled water. Dehydration can be provided by desiccants or thermoelectric coolers. Humidity is measured using standard polymer film humidity sensors.

Challenges in maintaining near saturated humidity environments. Current gloveboxes are not designed to deliver and operate with near-saturating internal humidities. This is especially true of gloveboxes incorporating microscopes. Many samples, including small biological samples such as single cells, small tissue samples, and protein crystals (used in X-ray studies of protein structure) have equilibrium water activities corresponding to relative humidities between 95% and 100%. When held in atmospheres with lower relative humidities, they dehydrate, at a rate that depends on the difference between the sample's initial water activity and the chamber's relative humidity, on the sample volume and exposed surface area, and (to a weaker extent) on the presence of convective gas flows within the chamber (with forced convective gas flow velocities above ~2 m/s required to substantially enhance evaporation rates over those that occur in the absence of forced convection.) This dehydration can damage or destroy the samples and otherwise change their physical properties. For larger samples, substantial dehydration may be unlikely to occur during typical working times of minutes to an hour within gloveboxes. But for single cells or small protein crystals, significant dehydration can occur in minutes or even seconds, even at 90% relative humidity (r.h.).

Methods used for generating humidified air in commercial gloveboxes cannot reliably and accurately deliver humidities above 95% (or even above 90%) at ambient temperature, and the time required to reach near saturated humidity can be hours. Ultrasonic devices produce microdrops that do not fully vaporize at high humidities before they contact internal glovebox surfaces, leading to excessive water accumulation on interior surfaces. Semi-permeable membranes are ineffective in generating near saturated humidities in glovebox volumes and their performance degrades when contaminated. Bubblers require extremely long bubble paths, and/or heating of the water and thus of the humid air produced followed by cooling to the final temperature, to achieve high humidities in reasonable time intervals.

As long as liquid water gets deposited inside the glovebox and the glovebox is sealed, the humidity will eventually reach saturation (in at least the cooler parts of the glovebox), but the time required can be very long, and restoring the humidity to near saturated conditions when, e.g., a door is opened to load materials into the glovebox can be long. Our experiments using ultrasonic vaporizers suggest that the time for near saturated (above 95% r.h.) conditions to occur is measured in hours (even though some glovebox surfaces may accumulate water drops long before then), longer than most glovebox users are willing to wait.

Furthermore, small temperature differences between an external humidified gas source (e.g., a bubbler or boiler system) and the glovebox walls and internal components have large effects on the relative humidity within the glovebox and are difficult to control. For example, 21.5° C. air at 97.8% r.h. will be 100% saturated at 21.0° C. So even tiny temperature differences can produce large r.h. differences.

Engineered solutions to these problems with ultrasonic vaporizers and heated water bubblers are theoretically possible but are likely to involve complex and costly mechanisms because of the sensitivity of r.h. in this range to small changes in temperature and also because of the difficulty of making accurate (to 1% or better), non-hysteretic, and rapid measurement of r.h. in this range needed for any control system.

The polymer film sensors typically used to measure humidity do not work reliably above 95% r.h. and can show large hysteresis (3% or more) at near saturating humidities. More accurate chilled mirror sensors cost more than typical humidified gloveboxes.

As the relative humidity rises above 95%, very small (0.5° C.) temperature differences between the source of humidified air, the internal surfaces of the glovebox and any components within are sufficient to cause fogging and condensation on cooler surfaces. These may include the walls of the glovebox, ports/windows for naked eye and microscope examination of samples within, as well as of microscope lenses which are typically attached to high thermal conductance microscope components that conducts heat to (often cooler) parts of the microscope outside the glovebox. All of this condensation/fogging can obstruct a user's view of the interior of the glovebox. This fogging/condensation readily occurs because the saturated water content of air varies rapidly with temperature. Fogging/condensation can also contaminate samples with excess water and change the concentration of solutions, especially when mist sources like ultrasonic humidifiers are used.

High humidities and condensation can lead to corrosion of metal components within the chamber including those of microscopes and light sources, swelling of permeable materials, weakening of adhesives, and other issues. They may be problematic for electrical/electronic devices within the chamber that are not fully sealed, especially if there is dripping water or water accumulation.

Additional challenges for humidified workstations in biomolecular X-ray crystallography. The field of biomolecular crystallography and specifically serial synchrotron crystallography present additional challenges in the design of humidified glovebox workstations. Crystals are placed on an X-ray transparent sample support, and then irradiated by an X-ray beam. Crystals are dispensed onto the support with liquid—which may be the solution from which the crystals grew, a solution containing a cryoprotectant such as glycerol or polyethylene glycol, or an oil. In fixed-target serial crystallography, a large number of small (~2 to 50 μm) crystals are dispensed onto an X-ray transparent sample support, which is then rastered or stepped through the X-ray beam. The sample support typically has an array of through-holes that are smaller than the crystals of interest. To minimize X-ray background scatter, as much of the liquid around the crystals should be removed as possible. This is typically done by blotting the front and backside of the sample support and/or by applying suction to the backside of the support to draw liquid through holes in the support. Removal of liquid through holes can also help drive movement of crystals on the top surface of the support to the holes, positioning them over/within the holes, which can reduce X-ray background scatter and make it easier to locate crystals. Deposition and then removal by blotting or suction of solutions containing ligands, cryoprotectants, or other components can also be performed directly on crystals on the sample support.

Because the crystals used in serial crystallography can be so tiny, they can dehydrate very quickly—in a few seconds. This dehydration can seriously degrade their X-ray diffraction and make the crystals nonisomorphous. For example, reducing the relative humidity of a biomolecular crystal by as little as 2% can be sufficient to induce a structural transformation in its lattice that changes or even destroys its X-ray diffraction pattern. As a result, all crystal manipulations, including deposition on the sample support, removal of excess liquid via blotting or suction, and sealing of sample supports using sealing films, should ideally performed in a near saturating humidity environment. Deposition of micrometer-size crystals and liquid on serial crystallography sample supports, and removal of liquid by blotting and/or suction must be done precisely, particularly if the goal is to position the crystals near holes in the support. This generally requires that the crystals and sample support be viewed through a microscope during these operations. This in turn requires adequate magnification and adequate illumination of the sample and support.

Description of the Related Art Section Disclaimer: to the extent that specific patents/publications/products are discussed above in this Description of the Related Art Section or elsewhere in this disclosure, these discussions should not be taken as an admission that the discussed patents/publications/products are prior art for patent law purposes. For example, some or all of the discussed patents/publications/products may not be sufficiently early in time, may not reflect subject matter developed early enough in time and/or may not be sufficiently enabling so as to amount to prior art for patent law purposes. To the extent that specific patents/publications/products are discussed above in this Description of the Related Art Section and/or throughout the application, the descriptions/disclosures of which are all hereby incorporated by reference into this document in their respective entirety(ies).

SUMMARY

The present disclosure relates to humidified gloveboxes that can reliably and inexpensively deliver very high/saturating humidities (>95% r.h.) within a short time after the start of humidification with minimal fogging or condensation on internal surfaces, and that allow accurate measurement of those humidities. The disclosure further relates to near saturating humidity gloveboxes that allow illumination and microscope examination of samples within the glovebox using integral sample illuminators and a variety of external microscopes. The disclosure further relates to humidified gloveboxes that can enclose serial crystallography sample loading end stations and provide connections for vacuum/suction for those end stations.

DETAILED DESCRIPTION

Aspects of the present disclosure and certain features, advantages, and details thereof, are explained more fully below with reference to the non-limiting examples illustrated in the accompanying drawings. Descriptions of well-known structures are omitted so as not to unnecessarily obscure the disclosure in detail. It should be understood, however, that the detailed description and the specific non-limiting examples, while indicating aspects of the disclosure, are given by way of illustration only, and are not by way of limitation. Various substitutions, modifications, additions, and/or arrangements, within the spirit and/or scope of the underlying inventive concepts will be apparent to those skilled in the art from this disclosure.

Figure 1A:
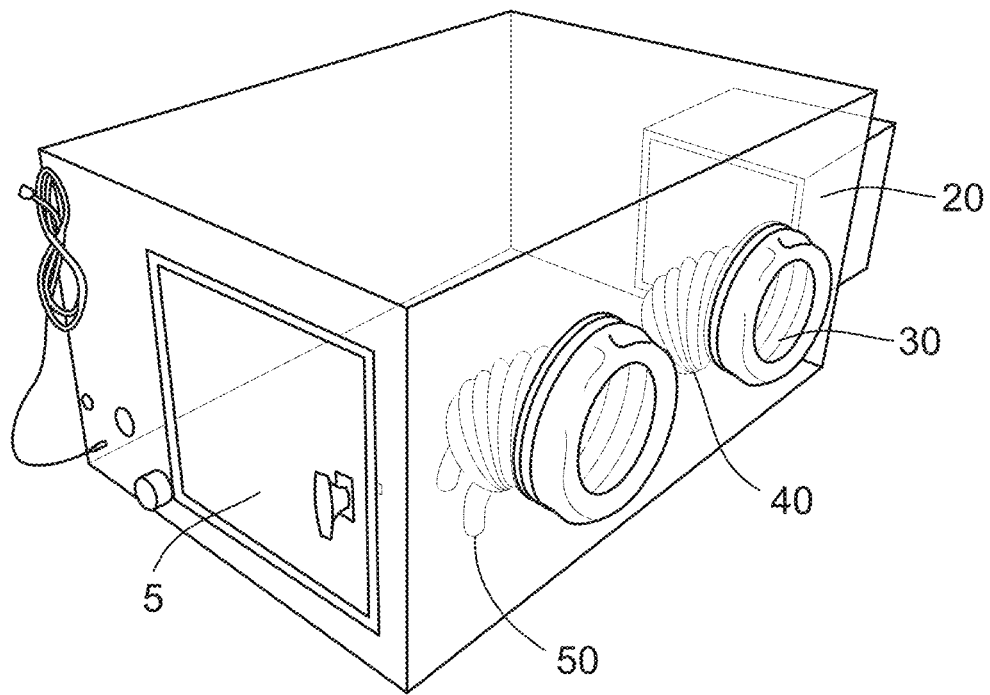
FIG. 1A is a perspective view of an example of a prior art glovebox.

FIG. 1A shows a typical prior art glovebox. It has a left side loading door 5 for loading equipment and supplies, a right-side air lock 20 for loading samples without disturbing the atmosphere within the main glovebox chamber, and two hand ports 30 with flexible feedthroughs 40 and gloves 50. The glovebox may have inlet ports for connecting a gas source (e.g., dry air, dry nitrogen), and an outlet gas port with a pressure release valve (not shown). It may also have an internal light source and a power outlet strip. Most of the walls of the glovebox are optically clear to allow objects inside to be observed. The clear material is usually plexiglass/lucite or a similar polymer material, although glass can also be used.

Figure 1B:
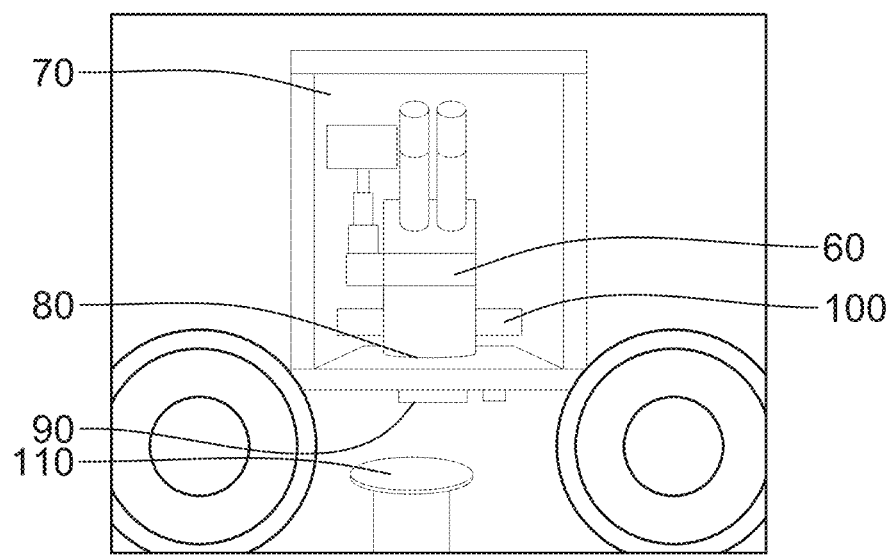
FIG. 1B is a perspective view of an example of a prior art glovebox.
Figure 1D:
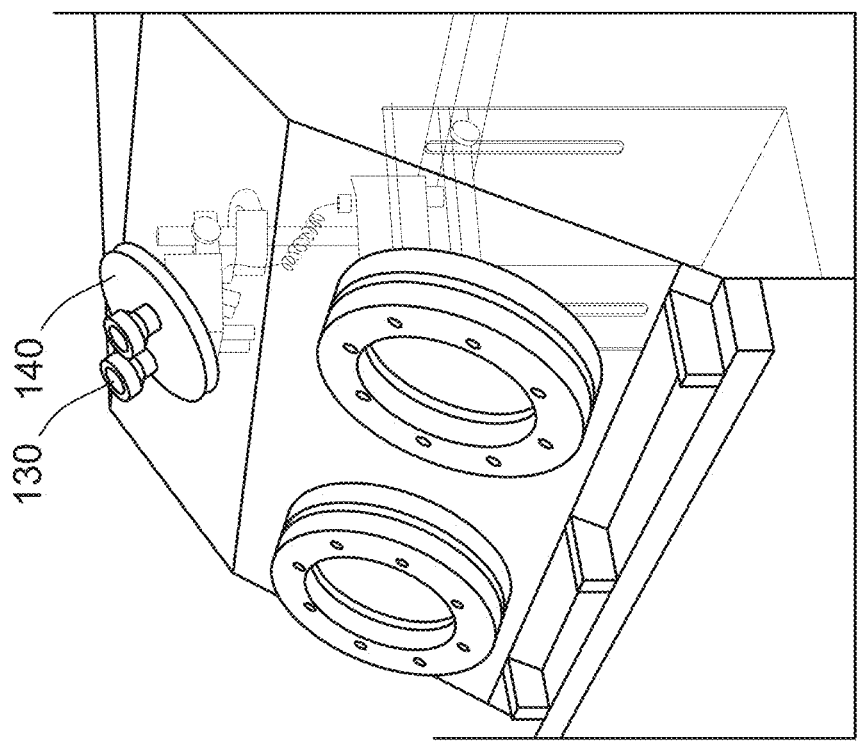
FIG. 1D is a perspective view of an example of a prior art glovebox.
Figure 1C:
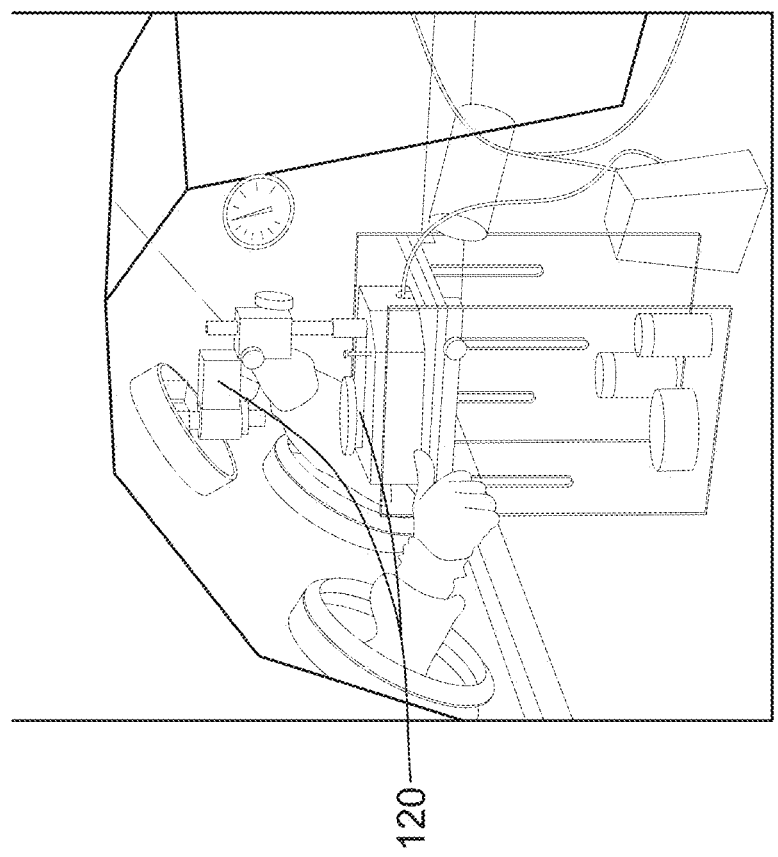
FIG. 1C is a perspective view of an example of a prior art glovebox.

FIGS. 1B and 1C show prior art gloveboxes designed for use with a microscope to allow magnified observation of samples within the glovebox. In FIG. 1B, the microscope head 60 is mounted in a recessed region 70 on the outside of the glovebox, so that the eyepieces are directly accessible outside. The base of the microscope head inserts into a port 80 in the bottom of the recess, so that the microscope objective lens 90 is within the enclosed chamber. The microscope zoom controls 100 can be extended through airtight ports so that they can be operated from within the glovebox. Since the microscope head position is fixed, focusing is achieved by mounting the sample on an adjustable height stage 110 within the chamber and adjusting the stage height. Sample illumination is via reflection of light coming from above. This design and, specifically, the feedthrough ports for the objective lens and zoom controls must be customized for each microscope brand and type to ensure an air-tight seal, and requires use of microscopes that are air-tight/sealed so that gas cannot flow from outside to inside the glovebox through the microscope.

FIGS. 1C and 1D show prior art examples of a glovebox in which the microscope with sample and illuminator stage 120 is entirely enclosed within the glovebox, with only the eyepieces 130 projecting through a sealed port 140 to the outside.

In conventional microscope-compatible glovebox designs, a large volume of glovebox space is inefficiently used because part or most of the microscope's height must be enclosed within it. As a result the overall size of the glovebox is increased, and its cost and complexity are increased. Most microscope-capable gloveboxes are designed for use while standing. In addition, these designs do not facilitate microscope observation of different items in the glovebox (e.g., multiwell plates and mounted crystals in protein crystallography applications) unless they can be easily accommodated on the sample stage and do not require a shift in focus beyond the vertical travel range of the microscope or stage. Most tools and supplies typically used in gloveboxes are perhaps 10 cm or less in height.

Furthermore, if humidified gas is supplied to one of these gloveboxes (or generated within it) so that that the gas in the glovebox is at or near saturating humidity, the microscope objective lens will fog up. The methods commonly used to generate humidified gas produce gas that is at least slightly warmer that the ambient air outside the glovebox. Consequently, thermal conduction from the objective lens assembly through the microscope body to the outside lowers its temperature relative to the humidified gas inside, promoting fogging and condensation on the lens. Furthermore, condensation on the microscope, sample stage, and illuminator within the glovebox can cause them to corrode over time, especially when the interior humidity is near saturation.

Figure 2:
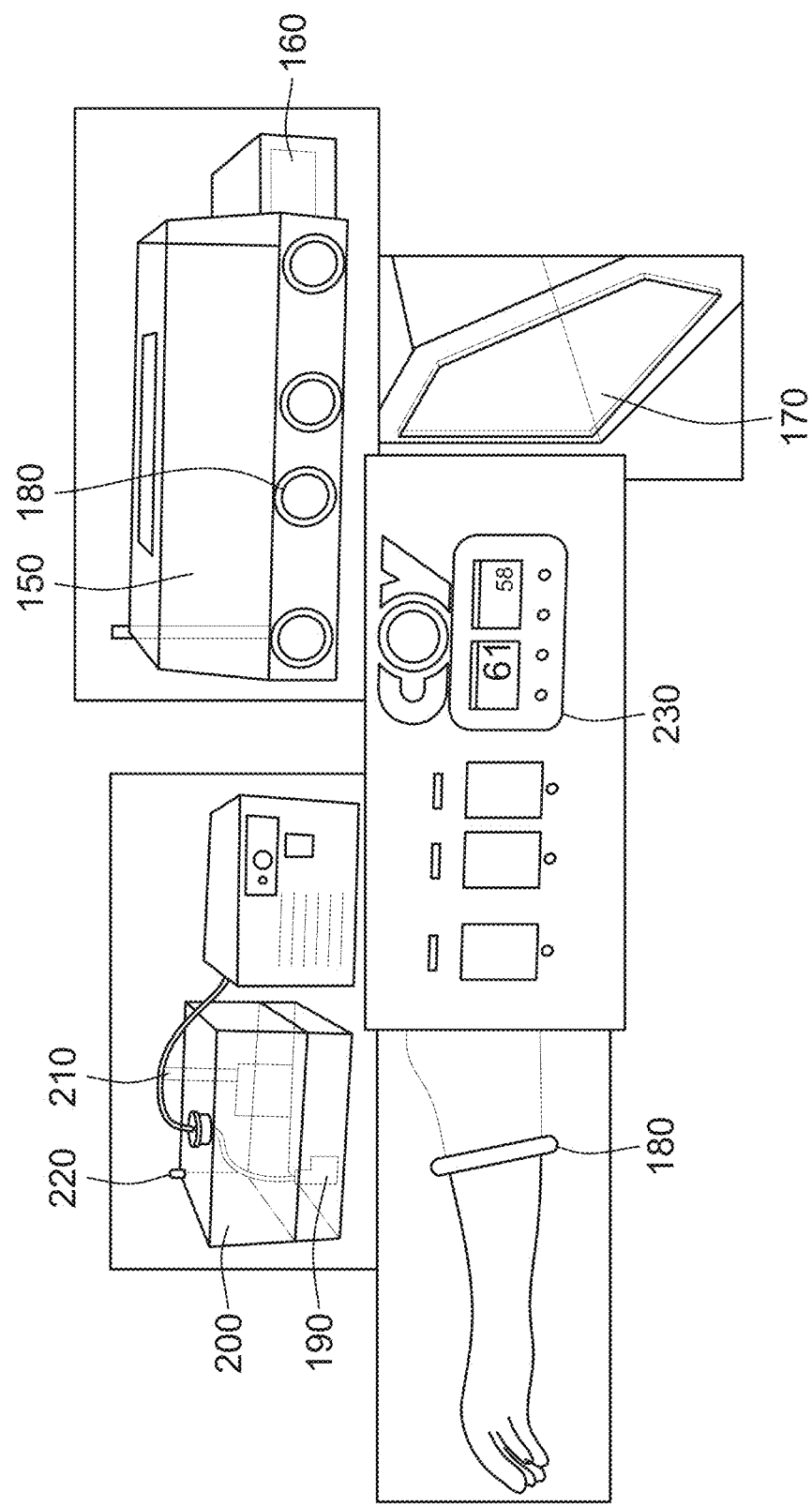
FIG. 2 are perspective views of a prior art humidified glovebox system.

FIG. 2 shows an example of a prior art humidified glovebox system. The glovebox 150 has a right-side air lock 160 for loading samples and can have a left side door 170 for loading other materials. Gloved ports 180 receive a user's hands to allow for manipulations inside the chamber of the glovebox 150. Humidified gas is generated externally by an ultrasonic vaporizer 190 immersed in a tank 200 filled with water. The tank has ports for outgoing 210 and incoming 220 gas, and a pump drives the circulation of the gas through the glovebox. A humidity controller 230 has humidity and temperature readouts.

Figure 3B:
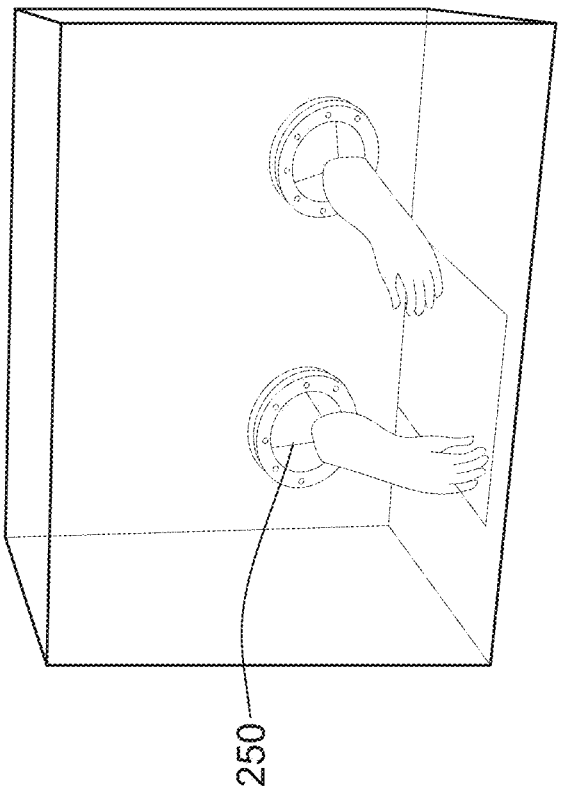
FIG. 3B is a perspective view of an example of a prior art hand port.
Figure 3A:
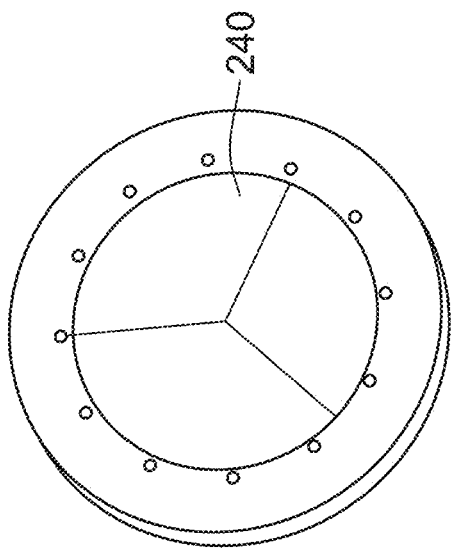
FIG. 3A is a perspective view of an example of a prior art hand port.
Figure 3C:
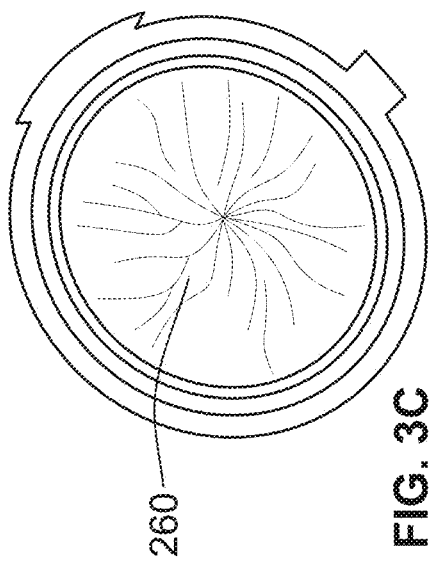
FIG. 3C is a perspective view of an example of a prior art hand port.

FIGS. 3A-3C show examples of "gloveless" hand ports that form tight seals around a user's arms. An "iris" hand port 240, 250 consists of many layers of rubber cut as shown and arranged with different relative orientations. Another hand port 260 uses a flexible material that is gathered around a central opening by an elastic band.

Figure 4A:
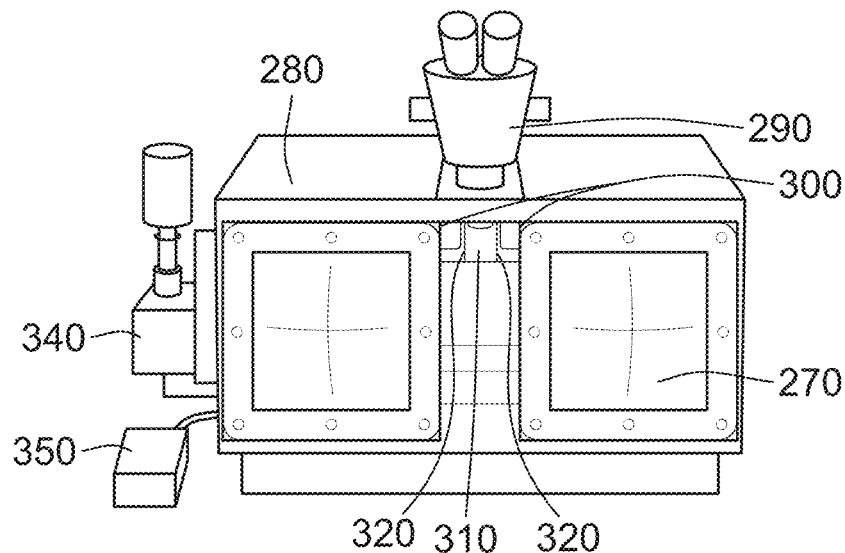
FIG. 4A is a perspective view of humidified sample preparation station for serial crystallography according to an embodiment.
Figure 4B:
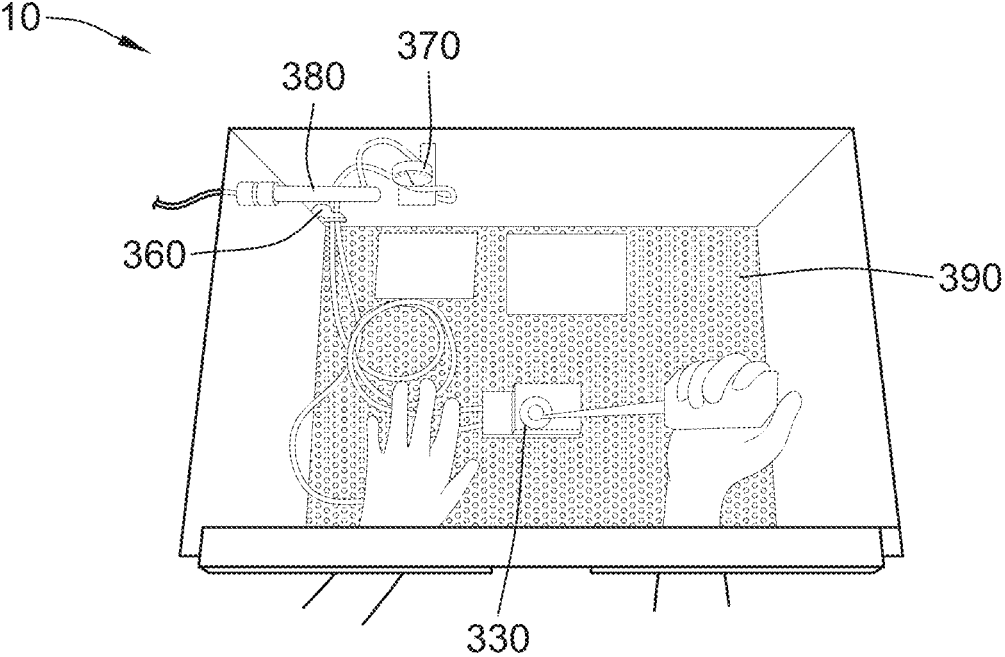
FIG. 4B is a perspective view of humidified sample preparation station for serial crystallography according to an embodiment.

Referring now to FIGS. 4A and 4B, there is shown a front view of an example a compact benchtop humidity-controlled glovebox with integrated optical imaging system, referred to generally by reference numeral 10, according to an embodiment of the present disclosure. In this example, the glovebox 10 has iris-type hand ports 270 formed of only two layers of thin, highly elastic rubber. These can be sufficiently air tight and to provide adequate sealing to the hand without the substantial discomfort and strong constraint on arm position caused by the pressure of, e.g., 10 layer iris hand ports in FIGS. 3A and 3B, and without the concentrated force/high local pressure exerted on the arm by the elastic band in the port of FIG. 3C. This example glovebox 10 also has a hinged lid 280 for loading materials and samples, which reduces bench space required for the glovebox 10 relative to a design with side entry doors. The glovebox 10 shown has internal dimensions of roughly 60×40×30 cm, sufficient to hold a variety of materials and supplies used, e.g., in protein crystallography, including crystallization microwell plates, vials and bottles containing buffers, cryoprotectants, and other solutions, pipettors, pipette tip racks, tweezers, and sample supports used in X-ray measurements.

A standard stereo zoom microscope head within its focusing rack 290 can be attached to a "sled" 300 which can be formed of two metal rails. The microscope and sled 300 can rest in a box-shaped trough or recess 310 in the top of the glovebox 10. The microscope head can slide forward and back within the trough 310 to allow imaging of different objects within the glovebox 10 (e.g., a crystal holder and a crystallization tray). A wide variety of commercial stereo zoom microscope heads can be mated with rails and used with the glovebox 10, without modification of the glovebox 10. Both the zoom and focus controls of the microscope head can be accessible from outside the box.

In embodiments where all microscope optics are outside the box, they do not fog up; the microscope does not need to be airtight/sealed; and corrosion does not occur. However, the inside surface of the optically clear bottom window of the trough 310 can fog up. To solve this, one embodiment of the glovebox 10 comprises strip heaters 320 which can be attached to the bottom window. These can be operated at low power to warm the windows just above the dew point—i.e., by only 1 or 2° C., so that the gas within the glovebox 10 is not appreciably warmed. In one embodiment with a stereo zoom microscope head, a ring LED illuminator can be attached to the objective portion of the microscope head for epi illumination of the sample and will fit within the trough 310.

Aside from providing stable support and reproducible positioning, the box-shaped trough 310 can lower the microscope and its objective lens. This can reduce the maximum working distance required for the objective to be able to image the sample and any other objects within the glovebox 10, and increase the achievable image resolution and maximum objective magnification and overall microscope magnification. For example, typical stereo zoom microscopes have a 0.7-4.5× objective magnification range and a working distance of only 10 cm (or less). If the top of the glovebox 10 were flat and the microscope head mounted on it, the interior height of the glovebox 10 would have to be reduced and would be too small for many applications, unless the sample was mounted on a tall stage high above the bottom of the glovebox 10 (as in FIG. 1C). However, a tall stage would likely require other materials and components used within the glovebox 10, e.g., multiwell plates, to be mounted on tall supports to make transfers to the sample stage and microscope observation convenient. With the box-shaped trough, the interior glovebox 10 height is only reduced in a narrow region over the sample. The width of the trough can be such that the sample can still be easily accessed with long pipetters, tweezers, and other tools held at comfortable angles. For example, in the embodiment shown in FIG. 4, the glovebox 10 has interior dimensions of roughly 60 cm wide×45 cm deep×30 cm high and the trough has dimensions of roughly 12 cm wide×7 cm deep other sizes can be used as well. The microscope head in the example shown in FIG. 4 has a 0.5× Barlow lens and 10× eyepieces, giving a 20 cm working distance and a magnification range between 3.5 and 22.5×.

In one embodiment (designed for preparing samples for serial protein crystallography), a sample loading station 330 placed within the glovebox 10 allows suction/vacuum to be applied to the sample. The suction can be generated using a vacuum pump 340 or venturi vacuum generator and can be controlled by a foot pedal valve 350. The glovebox 10 can have feedthrough connectors for a vacuum and make-up gas 360, a pressure gauge 370 for monitoring the vacuum (not the pressure inside the glovebox 10), and a combined humidity/temperature sensor 380 connected to an external readout.

In the embodiment shown in FIGS. 4A and 4B, the humidification system 12 can generate humidity within an internal chamber 17 (FIG. 5) of the glovebox 10 as follows. Beneath the perforated work surface 390 can be a water absorbent foam layer (e.g., foam cylinder 410 of FIG. 6). This foam layer can be saturated with water and the glovebox 10 sealed. To speed the approach to saturated humidity, a set of strip heaters (e.g., strip heaters 320 of FIG. 4A) attached to the outside bottom surface of the glovebox 10 can gently warm the foam. In this way, relative humidities near 98% r.h. can be obtained in less than 10 minutes. Operation of the heaters can warm the gas within the glovebox 10 by up to 4° C. As the target humidity is approached, the heaters can be turned off; natural convection within the glovebox 10 and past the unheated glovebox 10 walls can cool the humid gas toward the ambient temperature. However, this may lead to some condensation on the glovebox 10 walls, because of the rapid variation of saturated water content (in grams of water per liter of air) with temperature.

The hand ports 270 in the humidified glovebox 10 of FIGS. 4A and 4B can each have two natural rubber diaphragms (e.g., elastic membranes 272 held by port frames 274 FIG. 5) with slits 276 oriented 90 degrees from each other. This X-Y slit arrangement can tightly seal the membranes 272 around a user's hands/arms as they are inserted into the hand ports 270 and allow internal humidity levels near 100% r.h. to be maintained.

Improvements can be made to the humidified glovebox 10 embodiment in FIGS. 4A and 4B, which is also referred to herein as "humidified sample preparation station". First, illumination of the sample from below—transmission mode illumination—can be achieved by placing an illuminator within a humidified enclosure 15 of the humidified sample preparation station 10, exposing it to corrosion and creating a possible shock hazard in the event of condensation. Second, the heating of the gas when the heaters are used to speed up evaporation can make it difficult to achieve a target humidity without excessive condensation on the interior surfaces of the glovebox 10. When heaters are not used, the time to approach a target humidity above 95% can be excessive. Third, the absorbent foam layer can be prone to molding/mildew unless removed to dry after each use, and this removal can be cumbersome.

Figure 5:
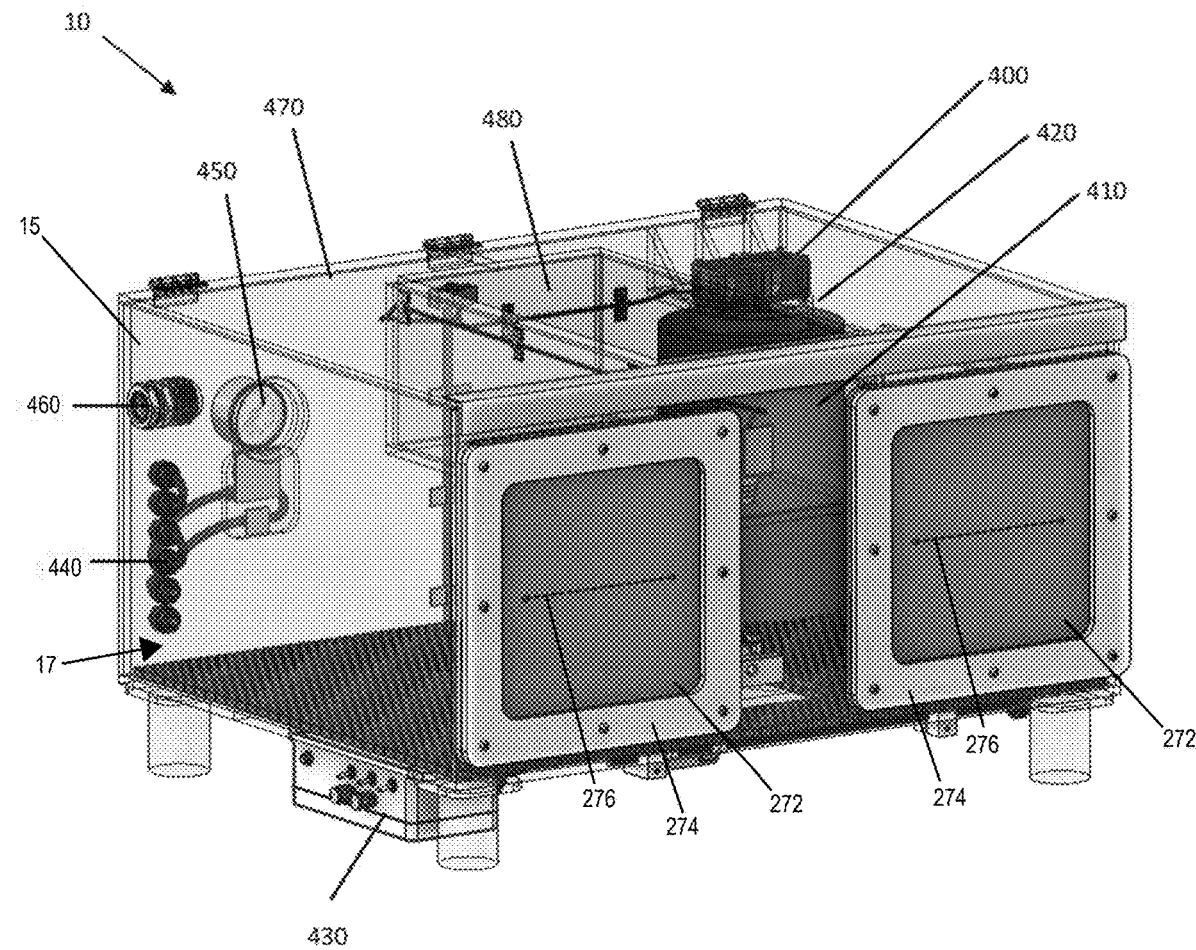
FIG. 5 is a perspective view of a humidified sample preparation station for serial crystallography according to an embodiment.

FIG. 5 shows a left-front view of an embodiment of a glovebox 10 that can incorporate improvements to the example in FIG. 4. In this example, the binocular microscope head and sled are not shown. Here, the interior gas can be humidified by blowing the gas using two fans 400 through absorbent foam shaped into a cylinder 410 with an open top and closed bottom, with both the fans 400 and cylinder held in place using a frame 420. The absorbent cylinder 410 can be removable. For example, before humidification, it can be removed and immersed in water, excess water can be squeezed out (as with a sponge), and then the cylinder 410 can be installed on the frame 420. The fans 400 can be turned on using one of the switches in the control box 430. The fans can be switched off when the desired target humidity is achieved, and can be switched on briefly to redistribute air within the enclosure. This humidification system 12 can deliver r.h. values above 95% within 10 minutes, and the humidity remains stable near its saturated value for hours, even when the interior of the glovebox 10 is accessed via the hand ports.

The humidification system 12 for generating near saturating humidities is a key feature of the embodiment. The humidity generating element can be within the glovebox 10 and can equilibrate with its temperature. The forced air flow can initially cause evaporative cooling of the water and absorbent cylinder, so that the r.h. of air generated is necessarily below saturation at the glovebox's ambient temperature. But as the r.h. approaches saturation evaporative cooling of the water and absorbent cylinder decreases. This naturally prevents temperature and humidity overshoot of humidified air supplied to the glovebox 10 interior that can occur when external or internal heated bubbler systems are used. Fan driven evaporation does not generate microdroplets like ultrasonic humidifiers. As a result, fogging and water accumulation on interior surfaces is greatly reduced. The forced air flow of the fans keeps both the humidity and the temperature uniform throughout the enclosed volume. This is true even though there may be differences in air temperature or air flow outside the different sides/surfaces of the glove box in a typical laboratory environment; and even though there may be cold or hot spots on the interior surfaces of the glove box (e.g., near external illuminators, where the microscope sled or other components with large thermal mass contact those surfaces, etc.). The airflows the fans generate do not dehydrate samples within because the humidities are so high. This approach to achieving near saturated humidities thus can have many advantages over humidity-generating systems used in prior art glove boxes.

The rear of the glovebox 10 can have feed-through connectors 440 for vacuum/suction, gas to replace ambient air (e.g., nitrogen ($N_2$) when an oxygen free environment is needed), and gas/pressure release. A pressure sensor 450 monitors suction/vacuum and can be visible to the user during sample manipulations.

Humidity and temperature can be measured using a heated polymer film probe that can be inserted into the port 460, and the measured values can be displayed using a compatible electronic display (not shown). Conventional polymer film humidity sensors give unreliable readings with large hysteresis at high humidities, and typically are not rated for use at humidities above 95% r.h. Heated polymer film humidity sensors can provide a lower cost alternative to chilled mirror sensors and can deliver 1% r.h. accuracy between 95% and 100% with little hysteresis. These sensors can heat the polymer film above ambient temperature so that it does not become saturated with water, and then apply a temperature correction to determine the r.h. at ambient temperature.

The top of the glovebox 470 can be hinged and can be opened as shown in FIG. 4B. The top can have a box-shaped trough or recess 480 for a "sled-mounted" binocular microscope head, such as microscope head 500 shown in FIG. 6, and heaters on the bottom surface of the trough to prevent fogging. The bottom surface of the trough can be of plexiglass or, if the best possible imaging quality is required, of flat glass. Good quality plexiglass gives satisfactory imaging performance but is subject to scratching. The glovebox 10 in FIG. 5 can have the same overall dimensions as in FIGS. 4A and 4B (60 cm wide×45 cm deep×30 cm high); alternatively, the trough width and depth can be increased to 19 cm and 13 cm, respectively, or any other suitable size as should be known in the art. The increased depth can allow the use of a microscope with a shorter working distance and larger magnification, and the increased width can be required to accommodate a focus knob 503 and a zoom knob 505. The width could be reduced by replacing the focus and zoom knobs 503, 505 with more compact versions. The microscope used with this version can have a 0.7× Barlow lens and 20× eyepieces, giving a 14 cm working distance and a magnification range between 10.5 and 67.5×.

Figure 6:
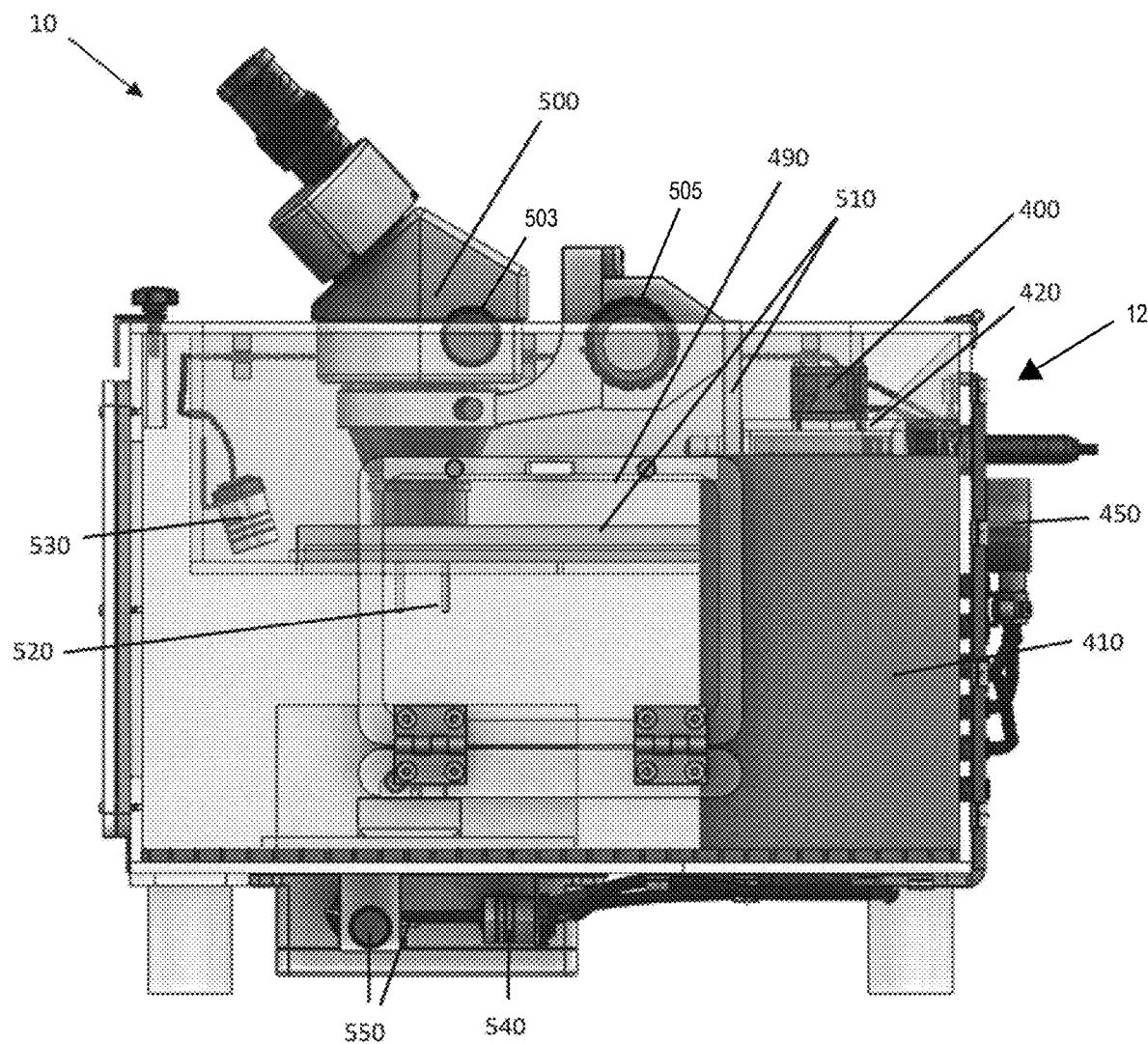
FIG. 6 is a side view of a humidified sample preparation station for serial crystallography according to an embodiment.

FIG. 6 shows a right-side view of an embodiment the glovebox 10. This example includes a side entry door 490 and can include a side air lock as in prior art designs. Here the microscope head 500 and the "sled" 510 that holds it in the trough are shown. In one embodiment, the trough includes a through-slot sealed by a slit membrane or other means, and the "sled" 510 to which the microscope can be attached can have a handle 520 that projects through the slot and into the humidified volume. The microscope can then be moved forward and back in its trough from within the humidified enclosure, to allow examination of different objects (e.g., a sample holder and a crystallization tray). Supports or risers can be made on which, e.g., crystallization trays, sample supports, and other objects can be placed to raise their relevant imaging plane to the same height, so that they can be imaged without refocusing the microscope.

A key feature of the present embodiment is that all microscope components can be outside the humidified volume, eliminating issues with fogging and corrosion of microscope components when operating at near saturating humidities. Fogging of the window through which the microscope observes the sample can be prevented by heaters that raise the temperature by at most 1 or 2 degrees C., to prevent warming of the glovebox 10 interior.

A first LED illuminator 530 can provide epi/reflected light illumination of a sample. A second LED illuminator 540 can generate light that can be reflected upward via a reflector assembly 550, providing transmitted light illumination of the sample.

Figure 7:
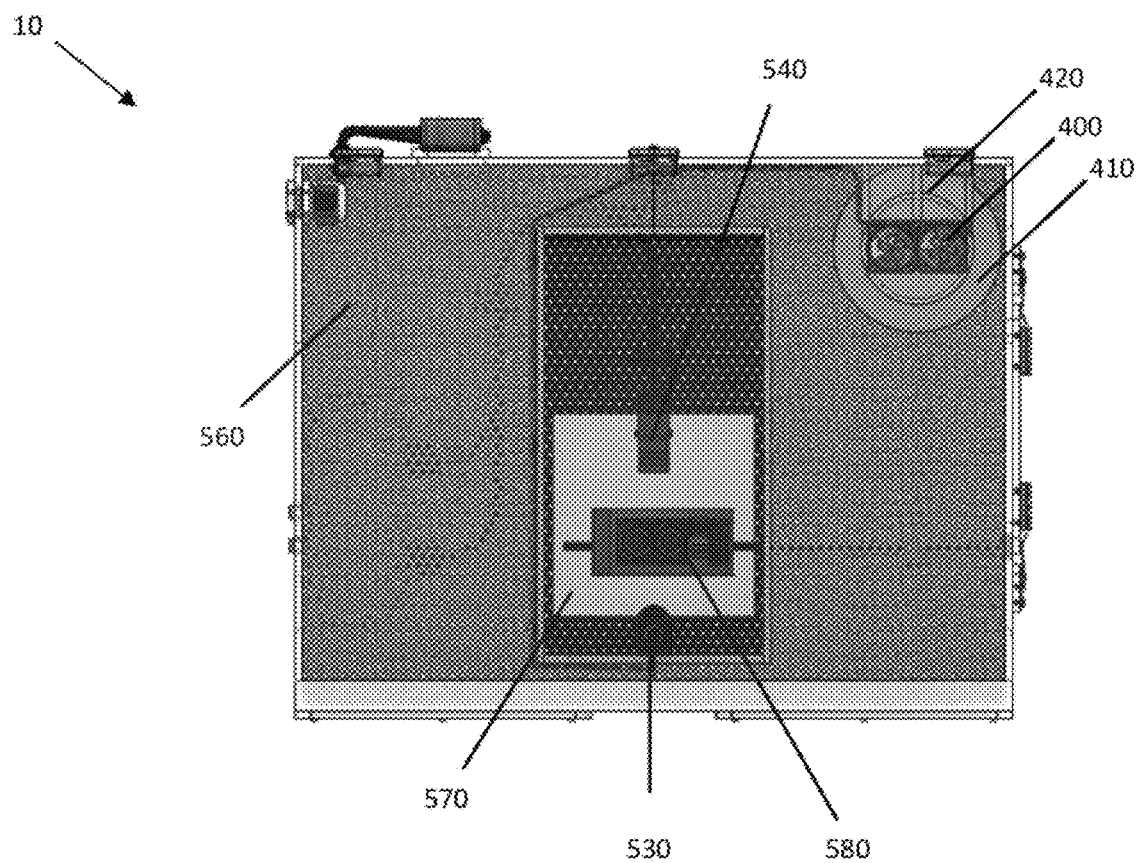
FIG. 7 is a top of a humidified sample preparation station for serial crystallography according to an embodiment.

FIG. 7 shows a top view of an embodiment of glovebox 10, illustrated with the microscope and sled removed. The top surfaces of the box can be optically clear to allow ambient light to enter the glovebox 10. A perforated metal (e.g., anodized aluminum) or plastic work surface 560 can rest on the bottom of the box, preventing scratching. The holes in this surface allow ambient light to enter the chamber from below. This work surface can have a rectangular opening with a glass insert 570, on which the sample loading station 580 to be examined by optical microscopy is placed.

Another key feature of some embodiments is that sample illumination can be provided by two separate light sources that can be both placed outside the humidified workspace so as to prevent fogging and corrosion.

Epi/reflective illumination can be provided by lens-collimated light from an LED source 530 placed at the front of the trough that holds the microscope. Transmitted light illumination can be provided by lens-collimated light from an LED source 540 placed below the bottom of the glovebox 10. Both LED light sources can be turned on and off by switches and have their light intensity modulated by variable resistors contained in the control box 430.

Figure 8:
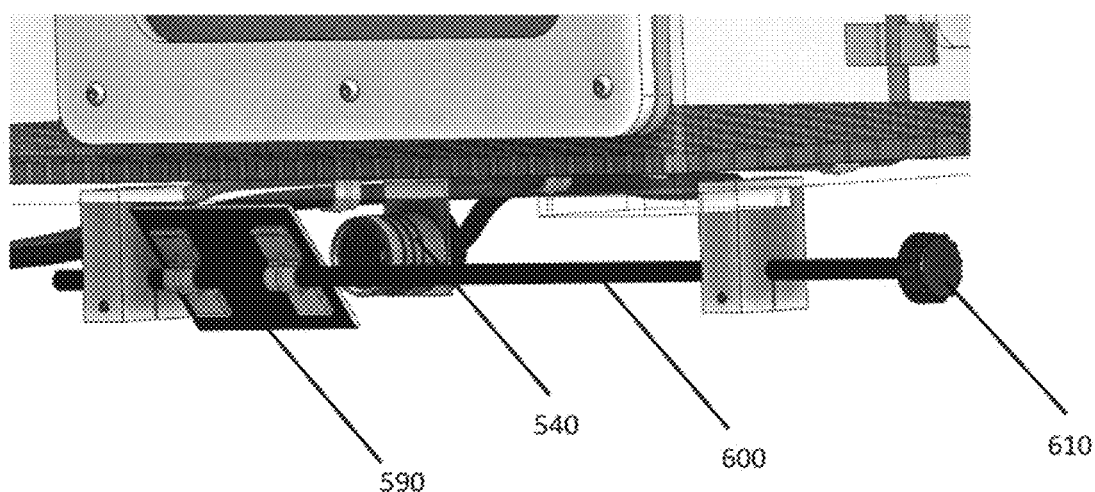
FIG. 8 is a perspective view of a humidified sample preparation station for serial crystallography according to an embodiment.

FIG. 8 shows an example of the transmitted illumination system on the bottom of an example of glovebox 10. In the embodiment shown the collimated LED light source 540 can be mounted horizontally and its light can reflect off a flat reflecting surface 590 that can be mounted on a rotatable shaft 600, directing it upward through the sample. The angle of the reflecting surface can be adjusted using knob 610 to provide sample illumination from a desired angle. For example, setting it to 45 degrees relative to the incident light from the LED source directs the reflected light straight up through the sample, which tends to maximize the light directly transmitted into the microscope objective and minimize contrast. Setting it somewhat off 45 degrees usually increases contrast, as less of the direct transmitted light reaches the microscope objective, so the image can be formed largely from light refracted, reflected, or diffracted by the sample.

The reflecting surface can be a mirror reflector; it can be white, it can be black, it can be dull metal, or it can be frosted glass. Some tests found that white and black tend to work best, as these scattered light over a wide range of angles that tended to maximize contrast. In one embodiment, the shaft had reflectors with two different reflecting surfaces, mounted side by side. The shaft 600 could be slid out and in, with detents, to select a given reflector.

The humidified glovebox 10 system as described in one example can quickly generate very high humidities—95-100% r.h. at ambient temperature. Modest forced convection can ensure that humidity and temperature are uniform within the glovebox 10 and on its interior surfaces, and help reduce moisture condensation on interior surfaces. Easy removal of the water absorbent cylinder facilitates drying and sterilizing between use. Both humidity and temperature can be accurately measured (to 1% in r.h.) without significant hysteresis in the humidity range between 95% and 100%. The glovebox 10 can accept most standard stereo zoom microscope heads and allow different positions along a line to be examined. The microscope head can be entirely housed outside the humidified space, and can have full focus and zoom capabilities, so that the sample stage can be of fixed height. The epi and transmitted illumination systems can be also both housed entirely outside the humidified space, minimizing risks of corrosion and electrical shorts. Heaters on optical surfaces of the glovebox 10 heat these surfaces slightly above ambient temperature, eliminating fogging without appreciably warming the gas inside. The simple, two-layer iris-like rubber hand ports allow easy insertion and removal of hands without appreciably affecting the humidity within the glovebox 10, and allow comfortable and fine manipulations of samples.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as, "has" and "having"), "include" (and any form of include, such as "includes" and "including"), and "contain" (any form of contain, such as "contains" and "containing") are open-ended linking verbs. As a result, a method or device that "comprises", "has", "includes" or "contains" one or more steps or elements. Likewise, a step of method or an element of a device that "comprises", "has", "includes" or "contains" one or more features possesses those one or more features but is not limited to possessing only those one or more features. Furthermore, a device or structure that is configured in a certain way is configured in at least that way, but may also be configured in ways that are not listed.

The corresponding structures, materials, acts and equivalents of all means or step plus function elements in the claims below, if any, are intended to include any structure, material or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of one or more aspects of the disclosure and the practical application, and to enable others of ordinary skill in the art to understand one or more aspects of the present disclosure for various embodiments with various modifications as are suited to the particular use contemplated.

What is claimed:

1. A humidified sample preparation station for a microscopic sample, the station comprising:
    an enclosure defining a chamber configured to contain the microscopic sample, the enclosure having an interior surface, an exterior surface, a door, a hand port, and a surface sufficiently optically clear to enable observation of the microscopic sample inside the chamber;
    a humidification system in communication with the enclosure and configured to generate an internal relative humidity (r.h.) in the chamber of at least about 90% r.h. at ambient temperature;
    an optically clear window formed through the interior and exterior surfaces of the enclosure;
    a heating element attached to the optically clear window and configured to raise a temperature of the optically clear window to eliminate fogging of the optically clear window;
    a microscope head attached to the enclosure external to the chamber and configured to observe the microscopic sample inside the chamber through the optically clear window; and
    an illuminator located on the exterior surface of the enclosure and configured to illuminate the microscopic sample inside the chamber.

2. The station of claim 1, wherein the hand port includes multiple air-tight hand ports each configured to receive therethrough a hand such that the hand inserts into the enclosure, each of the air-tight hand ports including at least two elastic membranes each having a slit.

3. The station of claim 2, further comprising a frame holding the at least two elastic membranes against each other, and wherein the slit of an inward one of the membranes is oriented at a right angle to the slit of an outward one of the membranes.

4. The station of claim 1, wherein the humidification system includes a fan-driven evaporative humidifier attached to the enclosure and in fluid communication with the chamber of the enclosure.

5. The station of claim 3, wherein the humidification system further includes:
    a water-absorbent foam material with an enclosed first end and an open second end;
    a frame attaching thereto the water-absorbent foam material and fans of the fan-driven evaporative humidifier, wherein the water-absorbent foam material is configured to be detached from the frame, removed from the enclosure, soaked in water, squeezed to remove excess water, inserted into the enclosure, and reattached to the frame, and wherein the fans of the fan-driven evaporative humidifier circulate air within the enclosure and through the water-absorbent foam material.

6. The station of claim 5, further comprising an electronic controller in communication with the fan-driven evaporative humidifier and configured to modulate a fan speed of the fans.

7. The station of claim 1, further comprising a heated polymer film humidity sensor attached to the enclosure and configured to measure the internal relative humidity inside the chamber with an accuracy of at least about 1% r.h.

8. The station of claim 1, further comprising a box-like trough recessed into a top surface of the enclosure, wherein the microscope head is mounted onto the exterior surface of the enclosure nested inside the box-like trough.

9. The station of claim 8, further comprising a sled structure movably mounting the microscope head to the enclosure within the box-like trough, wherein the sled structure and the box-like trough collectively constrain the microscope head in a first horizontal direction and enable the microscope head to slide within the box-like trough in a second horizontal direction substantially perpendicular to the first horizontal direction.

10. The station of claim 8, wherein the optically clear window defines at least a portion of a bottom of the box-like trough.

11. The station of claim 1, wherein the microscope head includes a zoom knob and/or a focus knob, and wherein the enclosure includes a feedthrough port through which is accessible the zoom knob and/or the focus knob.

12. The station of claim 1, wherein the illuminator includes a first illuminator mounted onto the exterior surface of the enclosure and configured to generate light directed through the optically clear window toward the microscopic sample.

13. The station of claim 12, wherein the first illuminator includes a ring illuminator extending around the microscope head and having a selectively varied light intensity.

14. The station of claim 1, wherein the illuminator includes a second illuminator mounted to a bottom exterior surface of the enclosure and a reflector mounted to the enclosure on a rotatable shaft, the reflector directing light generated by the second illuminator upward through the enclosure and into the chamber.

15. The station of claim 14, wherein the second illuminator includes a light-emitting diode (LED) light source with a selectively varied light intensity.

16. The station of claim 14, wherein the reflector includes a region that is mirror-like, white, black, or any combination thereof.

17. The station of claim 1, wherein the enclosure further includes:
a sample loading station located within the chamber and configured to support thereon the microscopic sample;
an external gas connection configured to connect to an external vacuum source; and
an internal gas connection configured to connect to the sample loading station.

18. The station of claim 17, wherein the enclosure further includes a pressure gauge connected to the external gas connection and/or the internal gas connection and configured to measure a vacuum pressure.

19. The station of claim 17, wherein the external vacuum source includes an external vacuum pump, a venturi vacuum generator, or a house vacuum.

20. The station of claim 1, further comprising a sample platform configured to hold the microscopic sample to be observed by the microscope head.

21. The station of claim 20, wherein the sample platform allows light directed from below the sample platform to pass directly through to the microscopic sample.

22. The station of claim 1, wherein the humidification system is configured to generate the internal relative humidity in the chamber of between about 95% and 100% r.h. at ambient temperature.

23. The station of claim 1, wherein the illuminator is configured to provide an epi light illumination and/or a transmitted light illumination, and wherein an intensity of illumination of the illuminator is configured to be continuously varied.

24. The station of claim 1, further comprising:
a vacuum connected to the enclosure and configured to suction the microscopic sample inside the chamber; and
a pressure gauge configured to measure a pressure of the vacuum.

25. A humidified sample preparation station for a microscopic sample, the station comprising:
an enclosure defining a chamber configured to contain the microscopic sample, the enclosure having an interior surface, an exterior surface, a door, a hand port, and a surface sufficiently optically clear to enable observation of the microscopic sample inside the chamber;
a humidification system in communication with the enclosure and configured to generate an internal relative humidity (r.h.) in the chamber of at least about 90% r.h. at ambient temperature;
an optically clear window formed through the interior and exterior surfaces of the enclosure;
a heating element attached to the optically clear window and configured to raise a temperature of the optically clear window to eliminate fogging of the optically clear window;
a microscope head attached to the enclosure external to the chamber and configured to observe the microscopic sample inside the chamber through the optically clear window; and
an illuminator located on the exterior surface of the enclosure and configured to illuminate the microscopic sample inside the chamber, wherein the illuminator is located within a box-like trough recessed into a top surface of the enclosure and is directed through the optically clear window located in the bottom of the box-like trough.

* * * * *